United States Patent Office 3,024,252
Patented Mar. 6, 1962

3,024,252
QUATERNARY AMMONIUM COMPOUNDS OF THE DIHYDROFURANE SERIES
Conrad Hans Eugster, Wallisellen, and Rolf Denss, Franz Häfliger, and Emil Girod, Basel, Switzerland, assignors to Geigy Chemical Corporation, Ardsley, N.Y., a corporation of Delaware
No Drawing. Filed Nov. 25, 1958, Ser. No. 776,212
Claims priority, application Switzerland Nov. 29, 1957
5 Claims. (Cl. 260—347.7)

The present invention concerns a process for the production of new quaternary ammonium compounds of the dihydrofurane series as well as the compounds obtained according to this process, which compounds have valuable pharmacological properties.

It has surprisingly been found that compounds of the general formula

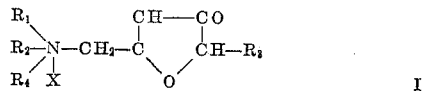

wherein $R_1$ and $R_2$ represent low molecular alkyl radicals which can also be bound to each other, $R_3$ represents an alkyl or cycloalkyl radical or an aryl or aralkyl radical which may possibly be substituted by low molecular alkyl or alkoxy groups or by halogen atoms, $R_4$ represents an alkyl or alkenyl radical or an aralkyl radical which may possibly be substituted by low molecular alkyl or alkoxy groups or by halogen atoms, and X represents a monovalent anion, in particular a halogen ion, or a normal equivalent of a polyvalent anion, have valuable neurophysiological properties. Particularly prominent is their stimulating action on the parasympathetic nerve endings which would appear to make such substances, in particular the most easily accessible 2-methyl-3-oxo-5-trimethylammoniomethyl - 2.3 - dihydrofurane salts, suitable, for example for the treatment of atony of the intestine or uninary bladder following operations or due to lesions of the spinal cord.

Compounds of the general Formula I defined above can be produced by reacting dihydrofurane derivatives of the general formula

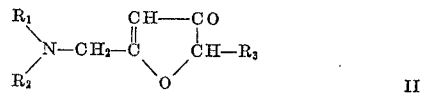

wherein $R_1$, $R_2$ and $R_3$ have the meanings given above, with reactive esters of aliphatic or araliphatic alcohols of the general formula

$$R_4\text{—OH} \quad \quad \text{III}$$

in which $R_4$ has the meaning given above, in particular with halides, sulphates or arylsulphonic acid esters and then, if desired, replacing the anion provided by the reactive ester by another anion.

The tertiary basic dihydrofurane derivatives used as starting materials of the general Formula II can be obtained by an easily performed reaction. This consists in reacting 2-substituted 5-formyl-furane-3-carboxylic acid alkyl esters with dialkyl formamides in formic acid according to Leuckart (Berichte der Deutschen Chemischen Gesellschaft, Vol. 18, 2341 [1885]; see also M. L. Moore, Organic Reactions V, p. 301 [New York 1949]), converting the 2-substituted 5-dialkylaminomethyl-furane-3-carboxylic acid alkyl esters obtained by way of the corresponding hydrazides into 2-substituted 5-dialkylaminomethyl-furane-3-carboxylic acid azides and decomposing the latter or carbamic acid esters prepared therefrom by reaction with an alcohol, e.g. benzyl alcohol, by means of hydrochloric acid. Examples illustrating these reactions are given in Belgian Patent No. 567,363. Suitable starting materials of the general Formula II are, for example, 2-methyl-3-oxo-5-dimethylaminomethyl - 2.3 - dihydrofurane,
2-n-propyl-3-oxo-5-dimethylaminomethyl - 2.3 - dihydrofurane,
2-isobutyl-3-oxo-5-dimethylaminomethyl - 2.3 - dihydrofurane,
2-cyclopropyl-3-oxo-5-dimethylaminomethyl - 2.3 - dihydrofurane,
2-phenyl-3-oxo-5-dimethylaminomethyl - 2.3 - dihydrofurane and
2-benzyl-3-oxo-5-dimethylaminomethyl - 2.3 - dihydrofurane.

The reactions of compounds of the general Formula II with reactive esters of alcohols of the general Formula III, in particular methanol esters, can be performed in the presence or absence of inert organic solvents such as, for example, acetone, butanone or ethyl acetate. Suitable quaternising agents are, for example, methyl iodide, methyl bromide, methyl chloride, ethyl bromide and iodide, n-propyl bromide and n-butyl bromide, allylbromide and iodide, p-toluene sulphonic acid methyl ester, dimethyl sulphate, benzyl chloride and bromide, as well as p-chloro-, p-methyl- and p-methoxy- benzyl bromide. If desired, after quaternising, the quaternary salts so obtained can be converted by methods known per se into salts or other acids, for example, by liberating the base and neutralising with another acid, or by double reaction with a suitable salt of another acid, for example reacting quaternary iodides with silver chloride suspensions, or by ion exchangers.

The following example further illustrates the production of the new quaternary ammonium compounds according to the present invention. The temperatures are in degrees centigrade.

*Example*

5 g. of 2-methyl-3-oxo-5-dimethylaminomethyl-2.3-dihydrofurane (produced according to Belgian Patent No. 567,363, Examples 1a–1d, Example 2 or Example 3) are dissolved in 75 ccm. of abs. acetone and 5 ccm. of methyl iodide are added. Heat is generated and the methoiodide separates out in crystal form. The crystals are isolated and washed with abs. acetone. The 2-methyl-3-oxo-5-(trimethylammoniomethyl) - 2.3 - dihydrofurane iodide which is so obtained in a pure form, melts at 136–139°. On shaking for 5 hours with excess silver chloride in 100 ccm. of water, concentrating in the vacuum at 50° and recrystallising the residue twice from abs. ethanol/acetone, the chloride of the quaternary base is obtained therefrom. It melts at 169–170°.

2-n-propyl - 3 - oxo-5-dimethylaminomethyl-2.3-dihydrofurane and 2-phenyl-3-oxo-5-dimethylaminomethyl-2.3-dihydrofurane for example can be converted in an analogous manner into the corresponding methoiodides.

What we claim is:

1. Quaternary ammonium compounds of the dihydrofurane series of the formula

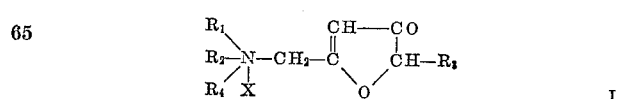

wherein $R_1$ and $R_2$ represent lower alkyl radicals,
$R_3$ represents a member selected from the group consisting of lower alkyl, cyclopropyl, phenyl and benzyl radicals,
$R_4$ represents a member selected from the group consisting of lower alkyl, lower alkenyl and benzyl radicals, and
X represents a halogen ion.

2. 2-methyl - 3-oxo-5-(trimethylammonio-methyl)-2.3-dihydrofurane-iodide.

3. 2-methyl - 3 - oxo-5-(trimethylammonio-methyl)-2.3-dihydrofurane-chloride.

4. 2-n-propyl - 3 - oxo-5-(trimethylammonio-methyl)-2.3-dihydrofurane iodide.

5. 2-phenyl - 3 - oxo-5-(trimethylammoniomethyl)-2.3-dihydrofurane iodide.

No references cited.